(12) United States Patent
Chen et al.

(10) Patent No.: US 11,616,543 B2
(45) Date of Patent: Mar. 28, 2023

(54) METHOD FOR DETERMINING UPLINK TRANSMISSION PARAMETERS AND METHOD AND DEVICE FOR TRANSMITTING CONFIGURATION INFORMATION

(71) Applicant: ZTE CORPORATION, Guangdong (CN)

(72) Inventors: Yijian Chen, Guangdong (CN); Zhaohua Lu, Guangdong (CN); YuNgok Li, Guangdong (CN); Yuxin Wang, Guangdong (CN); Hao Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 87 days.

(21) Appl. No.: 16/610,984

(22) PCT Filed: Apr. 18, 2018

(86) PCT No.: PCT/CN2018/083605
§ 371 (c)(1),
(2) Date: Nov. 5, 2019

(87) PCT Pub. No.: WO2018/201904
PCT Pub. Date: Nov. 8, 2018

(65) Prior Publication Data
US 2020/0169304 A1 May 28, 2020

(30) Foreign Application Priority Data
May 5, 2017 (CN) .......................... 201710313871.2

(51) Int. Cl.
*H04B 7/0456* (2017.01)
*H04B 7/06* (2006.01)
(Continued)

(52) U.S. Cl.
CPC ......... *H04B 7/0482* (2013.01); *H04B 7/0626* (2013.01); *H04L 5/0051* (2013.01);
(Continued)

(58) Field of Classification Search
CPC . H04B 7/0482; H04B 7/0626; H04L 25/0226; H04L 5/0048
See application file for complete search history.

(56) References Cited

U.S. PATENT DOCUMENTS 10,840,991 B2 * 11/2020 Kakishima ........... H04B 7/0626
2013/0142125 A1 6/2013 Shimezawa et al.
(Continued)

FOREIGN PATENT DOCUMENTS

| CN | 102932114 A | 2/2013 |
|----|-------------|--------|
| CN | 102958146 A | 3/2013 |

(Continued)

OTHER PUBLICATIONS

WIPO, International Search Report dated Jun. 21, 2018.
(Continued)

*Primary Examiner* — Zhensheng Zhang
(74) *Attorney, Agent, or Firm* — Li & Cai Intellectual Property (USA) Office

(57) ABSTRACT

A method for determining uplink transmission parameters and a method for transmitting configuration information. The method includes: receiving indication information transmitted from a network side; and determining uplink transmission parameters on the basis of the indication information. Also provided in the disclosure are a device for determining uplink transmission parameters and a device for transmitting configuration information, and a storage medium. The disclosure solves the problem in which a terminal cannot determine uplink transmission parameters in a variety of complicated antenna configurations, thus achieving the effect of effectively reduced overhead.

20 Claims, 6 Drawing Sheets

(51) Int. Cl.
*H04L 5/00* (2006.01)
*H04L 5/10* (2006.01)
*H04L 25/02* (2006.01)
*H04W 72/04* (2023.01)

(52) U.S. Cl.
CPC ............ *H04L 5/10* (2013.01); *H04L 25/0226* (2013.01); *H04W 72/042* (2013.01); *H04W 72/0413* (2013.01)

(56) References Cited

U.S. PATENT DOCUMENTS

| | | |
|---|---|---|
| 2014/0162718 A1 | 6/2014 | Li |
| 2015/0098346 A1 | 4/2015 | Guo et al. |
| 2016/0057757 A1 | 2/2016 | Papasakellariou et al. |
| 2016/0301505 A1 | 10/2016 | Furuskog et al. |

FOREIGN PATENT DOCUMENTS

| | | | | |
|---|---|---|---|---|
| CN | 103081388 A | | 5/2013 | |
| CN | 103096449 A | | 5/2013 | |
| EP | 1414253 A1 | * | 4/2004 | ........ H04W 72/1231 |
| WO | WO 2011098670 A1 | | 8/2011 | |
| WO | WO 2016/163843 A1 | | 10/2016 | |

OTHER PUBLICATIONS

European Patent Office, Partial Supplementary Search Report dated Dec. 22, 2020 corresponding to EP Application No. 18793988.9.

Zte et al: "Codebook based UL transmission" 3GPP Draft dated Apr. 2, 2017.

Zte et al: "Beam related indication for beam management" 3GPP Draft dated Feb. 12, 2017.

Zte et al: "Non-Codebook based and Hybrid based UI transmission" 3GPP Draft dated Apr. 2, 2017.

* cited by examiner

METHOD FOR DETERMINING UPLINK TRANSMISSION PARAMETERS AND METHOD AND DEVICE FOR TRANSMITTING CONFIGURATION INFORMATION

CROSS-REFERENCE TO RELATED APPLICATIONS

The present application is based on and claims a priority of the Chinese patent application No. 201710313871.2 filed on May 5, 2017, the entirety of which is hereby incorporated by reference.

FIELD OF THE INVENTION

The present disclosure relates to the field of communication, and in particular, to a method for determining uplink transmission parameters and a method and device for transmitting configuration information.

BACKGROUND

In a Long Term Evolution (LTE) system, only an antenna panel and a relatively small number of antenna elements (e.g., 2, 4 elements) are considered. Uplink Sounding Reference Signal (SRS) is non-precoded and is directly mapped to a port from an element. As a result, uplink transmission is relatively simple.

In 5G New Radio (NR), however, uplink Multiple Input Multiple Output (MIMO) transmission is much more complicated than that in LTE, which is mainly due to the following reasons:

Antenna configuration becomes complicated: NR can support more Panels that may have different directional characteristics; each of the Panels supports more elements, up to 32 elements. A schematic diagram of a new User Equipment (UE) antenna is shown in FIGS. 1a, 1b, and 2.

Flexible precoding selections at the UE side are supported: in 4G, precoding of the UE is completely controlled by a base station, resulting in inflexible uplink transmission. If this method is still adopted, it will be difficult to use a simple codebook for uplink transmission by a user when the antenna designs at the UE side are significantly different and the antenna designs for some users are relatively complicated. Therefore, the conventional scheme can only adapt to a certain part of terminals. Thus, for some terminals with special antennas, a more flexible transmission manner is needed so that a complicated codebook design is avoided. In addition, unlike in 4G, the terminal side may perform uplink transmission based on reciprocity after having enhanced functions, the principle of which is to measure a downlink pilot to obtain an optimal downlink pilot and thus an optimal downlink receiving beam corresponding to the optimal downlink pilot, and to perform reciprocity on an uplink transmitting beam when reciprocity is established.

In addition, consideration needs to be taken as to how to design the transmission of an uplink SRS and the transmission of an uplink control channel. However, no good uplink transmission design scheme has been available yet which can adapt to a variety of complicated antenna configurations, to fully utilize the channel reciprocity, effectively reduce the pilot overhead and the physical layer signaling overhead, and have better resistance to interference.

In LTE, uplink multi-antenna transmission supports some relatively simple functions, while in 5G NR, uplink MIMO transmission is much more complicated than in LTE.

In view of the above-mentioned problem that a terminal cannot determine uplink transmission parameters in a variety of complicated antenna configurations, no effective solution has been proposed in the related art.

SUMMARY

Embodiments of the present disclosure provide a method for determining uplink transmission parameters and a method and device for transmitting configuration information, so as to solve at least the problem that the terminal cannot determine uplink transmission parameters in a variety of complicated antenna configurations in the related art.

According to an embodiment of the disclosure, there is provided a method for determining uplink transmission parameters, including: receiving indication information transmitted from a network side; and determining uplink transmission parameters on the basis of the indication information.

According to another embodiment of the disclosure, there is further provided a method for determining uplink transmission parameters, including: transmitting indication information to a terminal, wherein the indication information indicates that the terminal determines uplink transmission parameters.

According to another embodiment of the disclosure, there is further provided a method for transmitting configuration information, including: transmitting configuration information of a terminal to a network side, wherein the configuration information includes at least one of: codebook configuration information of the terminal corresponding to an SRS; a codebook type supported by the terminal; the maximum number of supported layers corresponding to an SRS or a Panel; a maximum supported transmission power corresponding to an SRS or a Panel; a space angle range corresponding to an SRS or a Panel; the maximum number of supported SRS resource indicators (SRI) when uplink data transmission is supported; the maximum number of supported Downlink Reference signal indicator (DRI) SRI when uplink data transmission is supported; capacity of the terminal regarding whether it supports uplink transmission based on a downlink reference signal; capacity of the terminal regarding whether it supports selection of uplink codewords; capacity information of the terminal supporting single or multi-beam transmission; one of the following information that is most associated with a Demodulation Reference Signal (DMRS) port of the terminal: an SRS, a Channel State Information Reference Signal (CSI-RS) port, and the number of port groups; and the maximum number of estimated phase noise pilots supported by the terminal.

According to another embodiment of the disclosure, there is further provided a device for determining uplink transmission parameters, including: a receiving module configured to receive indication information transmitted from a network side; and a determining module configured to determine uplink transmission parameters on the basis of the indication information.

According to another embodiment of the disclosure, there is further provided a device for determining uplink transmission parameters, including: a first transmitting module configured to transmit indication information to a terminal, wherein the indication information indicates that the terminal determines uplink transmission parameters.

According to another embodiment of the disclosure, there is further provided a device for transmitting configuration information, including: a third transmitting module configured to transmit configuration information of a terminal to a network side, wherein the configuration information includes at least one of: codebook configuration information of the terminal corresponding to an SRS; a codebook type supported by the terminal; the maximum number of supported layers corresponding to an SRS or a Panel; a maximum supported transmission power corresponding to an SRS or a Panel; a space angle range corresponding to an SRS or a Panel; the number of supported SRIs when uplink data transmission is supported; the maximum number of supported DRI SRIs when uplink data transmission is supported; capacity of the terminal regarding whether it supports uplink transmission based on a downlink reference signal; capacity of the terminal regarding whether it supports selection of uplink codewords; capacity information of the terminal supporting single or multi-beam transmission; one of the following information that is most associated with a DMRS port of the terminal: an SRS, a CSI-RS port, and the number of port groups; and the maximum number of estimated phase noise pilots supported by the terminal.

According to still another embodiment of the disclosure, there is further provided a storage medium including a program stored thereon, wherein the program, when executed, performs any one of the above methods.

According to still another embodiment of the disclosure, there is further provided a processor for executing a program, wherein the program, when executed, performs any one of the above methods.

In the present disclosure, since the terminal receives the indication information transmitted from the network side; and determines uplink transmission parameters according to the indication information, the problem that the terminal cannot determine uplink transmission parameters in a variety of complicated antenna configurations can be solved, and the effects of determining the uplink transmission parameters in a variety of complicated antenna configurations and effectively reducing the overhead are achieved.

BRIEF DESCRIPTION OF THE DRAWINGS

The drawings described herein are intended to provide a further understanding of the present disclosure, and constitute a part of the present disclosure. The exemplary embodiments of the present disclosure and the description thereof serve to explain the present disclosure and do not constitute an undue limitation of the present disclosure. In the drawings.

DETAILED DESCRIPTION OF THE EMBODIMENTS

The disclosure will be described in detail below with reference to the drawings in conjunction with the embodiments. It should be noted that the embodiments of the disclosure and features therein may be combined with each other in any manner as long as they are not contradictory.

It should be also noted that terms "first", "second", and the like in the description, claims and drawings of the disclosure are used for the purpose of distinguishing similar objects instead of indicating a specific order or sequence.

Figure 1A:
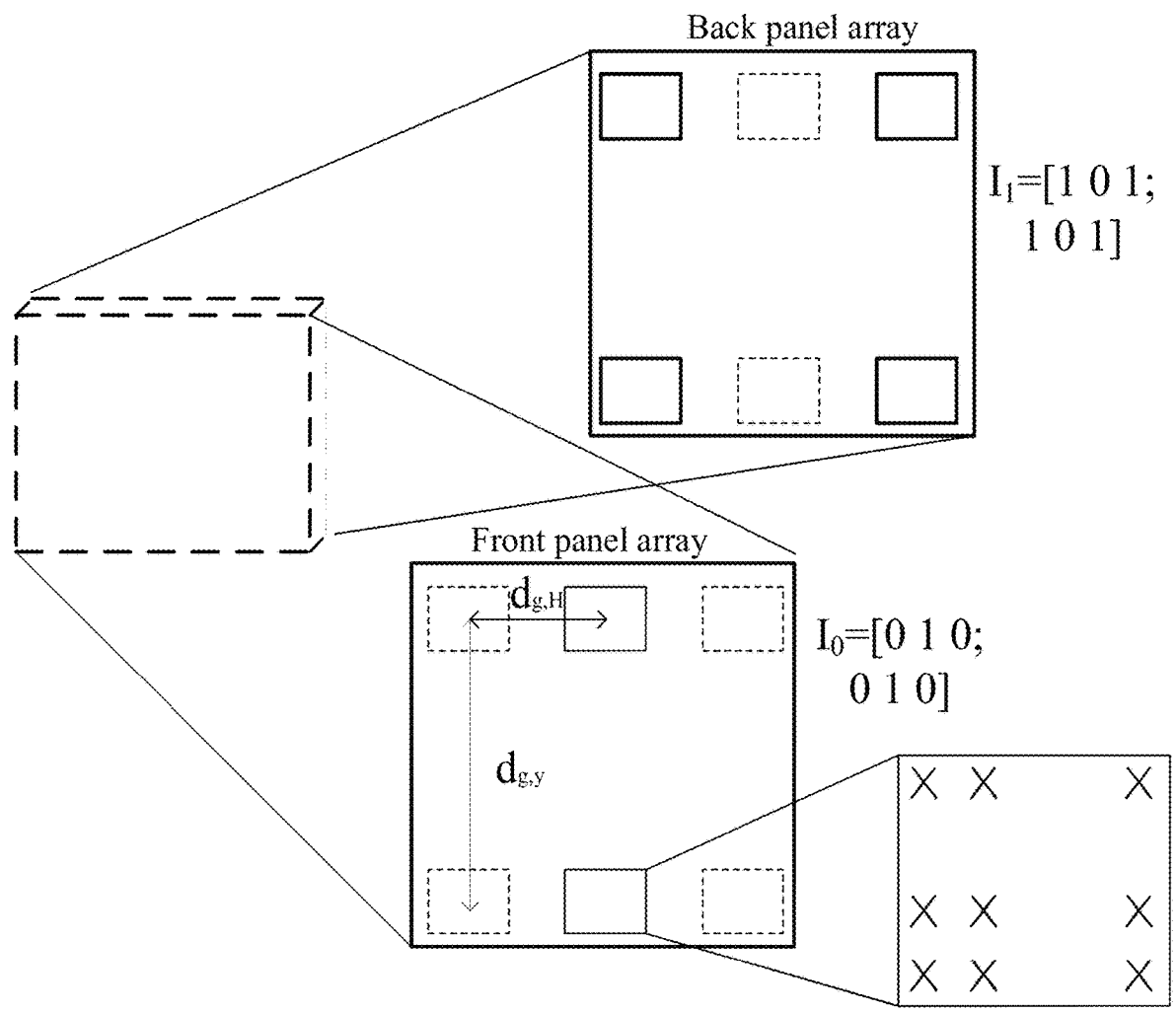
FIG. 1a is a first schematic diagram of a bidirectional antenna in the related art.
Figure 1B:
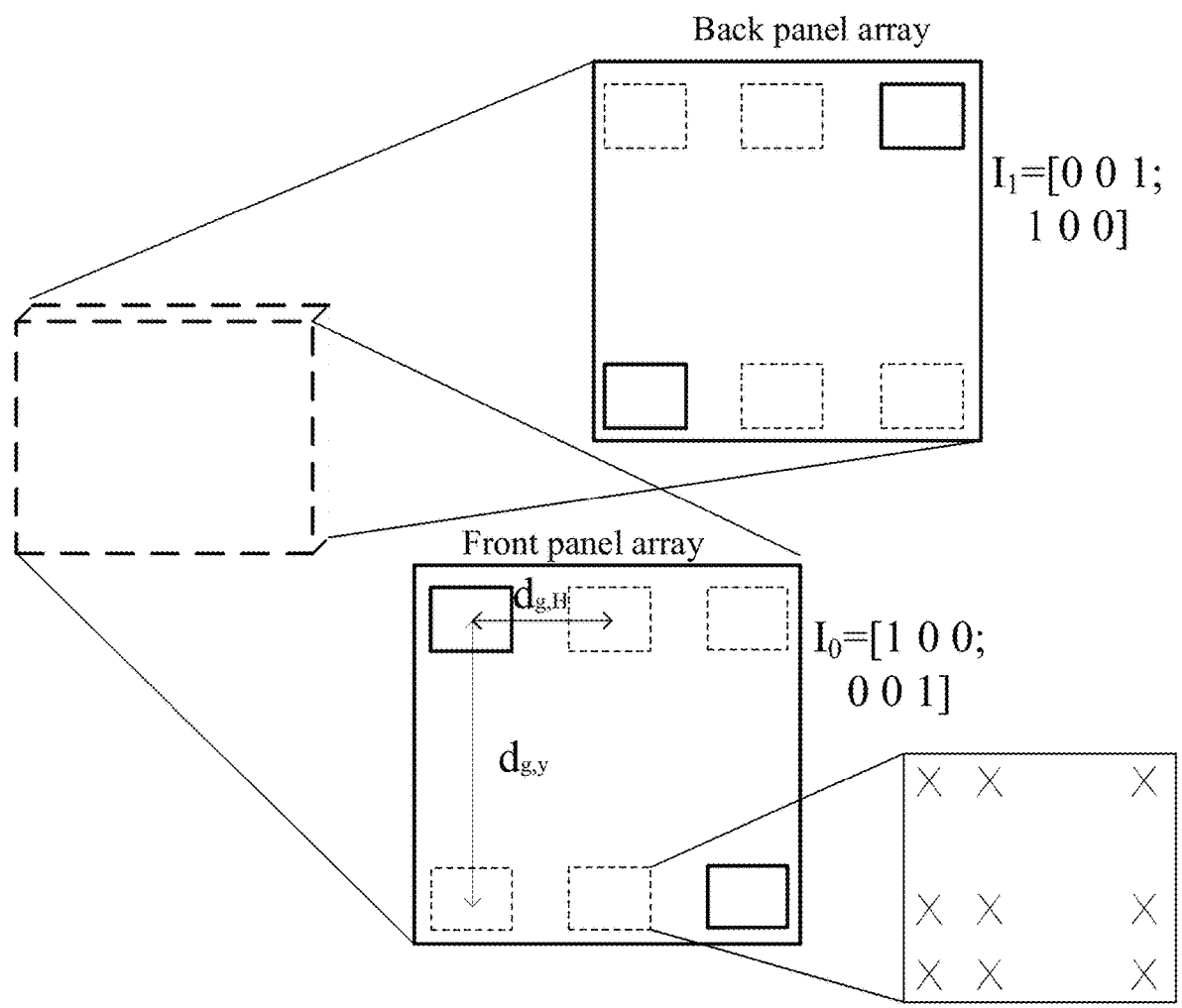
FIG. 1b is a second schematic diagram of a bidirectional antenna in the related art.
Figure 2:
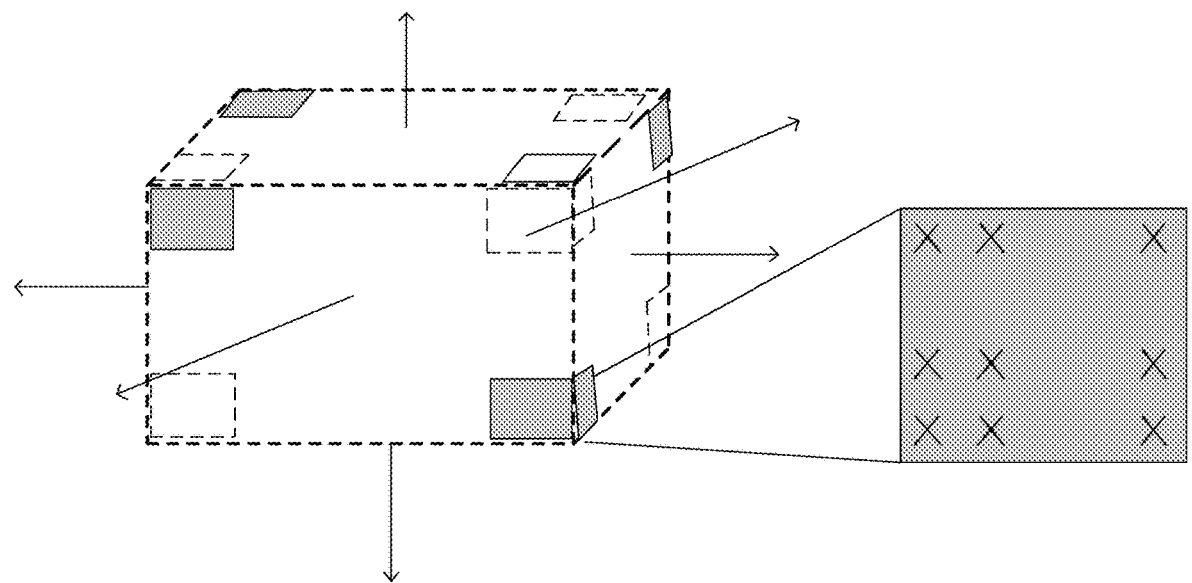
FIG. 2 is a schematic diagram of a 3D antenna in the related art.
Figure 3:
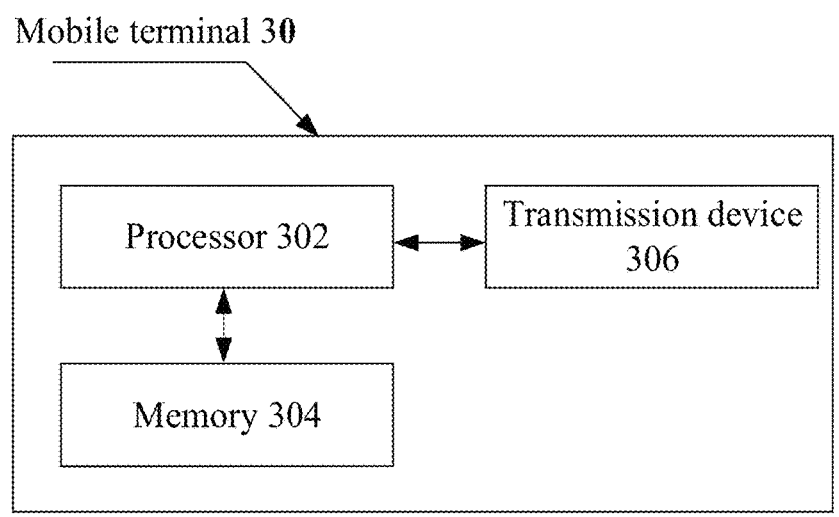
FIG. 3 is a structural block diagram of hardware of a mobile terminal in a method for determining uplink transmission parameters according to an embodiment of the present disclosure.

The method embodiment provided in Embodiment 1 of the present disclosure may be implemented in a mobile terminal, a computer terminal or other computing devices. Taking running on a mobile terminal as an example, FIG. 3 is a structural block diagram of hardware of a mobile terminal in a method for determining uplink transmission parameters according to an embodiment of the present disclosure. As shown in FIG. 3, a mobile terminal 30 may include one or more (only one is shown in FIG. 3) processor 302 (the processor 302 may include, but is not limited to, a microprocessor (MCU), a programmable logic device such as FPGA or other processing devices), a memory 304 for storing data, and a transmission device 306 for communication functions. It will be understood by those ordinary skilled in the art that the structure shown in FIG. 3 is merely illustrative, and does not form any limitation to the structure of the above electronic device. For example, the mobile terminal 30 may include more or fewer components than those shown in FIG. 3, or have a different configuration than that shown in FIG. 3.

The memory 304 may be configured to store software programs and modules of application software, such as program instructions/modules corresponding to the method for determining uplink transmission parameters in the embodiments of the present disclosure. The processor 302 executes the software programs and modules stored in the memory 304 to perform various functional applications and data processing, thereby implementing the above method. The memory 304 may include a high speed random access memory and may also include a non-volatile memory such as one or more magnetic storage device, flash memory, or other non-volatile solid state memory. In some examples, the memory 304 may further include a memory remotely located relative to the processor 302, which memory may be connected to mobile terminal 30 via a network. Examples of such networks include, but are not limited to, the Internet, intranets, local area networks, mobile communication networks, and combinations thereof.

The transmission device 306 is configured to receive or transmit data via a network. Specific examples of such networks may include a wireless network provided by a communication provider of the mobile terminal 30. In an example, the transmission device 306 includes a Network Interface Controller (NIC) that may be connected to another network device through a base station to communicate with the Internet. In an example, the transmission device 306 may be a Radio Frequency (RF) module configured to communicate with the Internet wirelessly.

Figure 4:
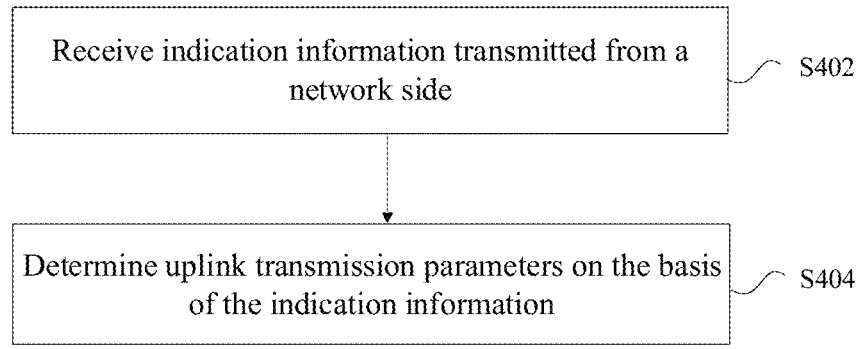
FIG. 4 is a first flowchart of a method for determining uplink transmission parameters according to an embodiment of the present disclosure.

In this embodiment, a method for determining uplink transmission parameters is provided. FIG. 4 is a first flowchart of a method for determining uplink transmission parameters according to an embodiment of the present disclosure. As shown in FIG. 4, the flow includes steps S402 to S404.

At step S402, indication information transmitted from a network side is received.

At step S404, uplink transmission parameters are determined on the basis of the indication information.

Through the above steps, since the terminal receives the indication information transmitted from the network side; and determines uplink transmission parameters according to the indication information, the problem that the terminal cannot determine uplink transmission parameters in a variety of complicated antenna configurations can be solved, and the effects of determining the uplink transmission parameters in the a variety of complicated antenna configurations and effectively reducing the overhead are achieved.

In an implementation, the executor of the above steps may be a terminal, but is not limited thereto.

In an alternative embodiment, the method includes at least one of: the step of receiving the indication information transmitted from the network side includes: receiving indication information of N downlink reference signal resource groups indicated by the network side, wherein each of the downlink reference signal resource groups includes one or more downlink reference signal resources; and the step of determining the uplink transmission parameters on the basis of the indication information includes: determining the uplink transmission parameters according to the received information corresponding to one or more of the downlink reference signal resources selected from the downlink reference signal resource groups, wherein N is an integer greater than or equal to 1; the step of receiving the indication information transmitted from the network side includes: receiving indication information of N codeword groups configured by the network side, wherein each of the codeword groups includes one or more codewords; and the step of determining the uplink transmission parameters on the basis of the indication information includes: determining the uplink transmission parameters according to one or more of the codewords selected from the codeword groups, wherein N is an integer greater than or equal to 1; the step of receiving the indication information transmitted from the network side includes: receiving N pieces of transmitting direction range information and/or direction extension information configured by the network side; and the step of determining the uplink transmission parameters on the basis of the indication information includes one of: determining the uplink transmission parameters according to one or more pieces of direction range information selected from the N pieces of transmitting direction range information, determining the uplink transmission parameters according to one or more pieces of direction extension information selected from the N pieces of direction extension information, and determining the uplink transmission parameters according to the one or more pieces of direction range information and direction extension information selected from the N pieces of transmitting direction range information and direction extension information, wherein N is an integer greater than or equal to 1; the step of receiving the indication information transmitted from the network side includes: receiving indication information of N transmission beam sets configured by the network side, wherein each of the transmission beam sets includes one or more transmission beams; and the step of determining the uplink transmission parameters on the basis of the indication information includes: determining the uplink transmission parameters according to one or more of the transmission beams selected from the transmission beam sets, wherein N is an integer greater than or equal to 1; and the step of receiving the indication information transmitted from the network side includes: receiving indication information of N channel state information processes (CSI Processes) configured by the network side; and the step of determining the uplink transmission parameters on the basis of the indication information includes: determining the uplink transmission parameters according to one or more of the CSI Processes selected from the N CSI Processes, wherein N is an integer greater than or equal to 1. In the present embodiment, when N=1, the selecting step is not required. Selection can be made only when N is greater than or equal to 2.

In an alternative embodiment, the indication information of the N downlink reference signal resource groups may include N CRI groups, wherein N is greater than or equal to 2, and may include at least one of: the N CRI groups corresponding to different subbands; the N CRI groups corresponding to different transmission layers; the N CRI groups corresponding to different SRS resources; the N CRI groups corresponding to different Physical Uplink Control Channel (PUCCH) resources; the N CRI groups corresponding to different Physical Uplink Shared Channel (PUSCH) resources; the N CRI groups being used for different transmission channels; the N CRI groups being used for different Panels; the N CRI groups being used for different codeword streams; the N CRI groups being used for channel information indication or interference information indication; and the N CRI groups corresponding to different transmission resources.

In an alternative embodiment, the method may further include: determining that the N CRI groups are able to be used for determining the uplink transmission parameters by a first signaling transmitted from the network side, wherein the first signaling is configured by the network side for at least one of: a subband, a layer, a PUCCH, a PUSCH, a transmission channel, and a Panel.

In an alternative embodiment, the method may include at least one of: the codewords included in the same codeword group coming from one or more codebooks; the N codeword groups corresponding to different subbands; the N codeword groups corresponding to different transmission layers; the N codeword groups corresponding to different SRS resources; the N codeword groups corresponding to different PUCCH resources; the N codeword groups corresponding to different PUSCH resources; the N codeword groups being used for different transmission channels; the N codeword groups being used for different Panels; the N codeword groups being used for channel information indication or interference information indication; and the N codeword groups corresponding to different transmission resources.

In an alternative embodiment, the method may include at least one of: the transmitting directions indicated by the N pieces of transmitting direction range information corresponding to same or different ones of N pieces of direction extension information; the N pieces of transmitting direction range information and/or direction extension information corresponding to different subbands; the N pieces of transmitting direction range information and/or direction extension information corresponding to different transmission layers; the N pieces of transmitting direction range information and/or direction extension information corresponding to different SRS resources; the N pieces of transmitting direction range information and/or direction extension information corresponding to different PUCCH resources; the N pieces of transmitting direction range information and/or direction extension information corresponding to different PUSCH resources; the N pieces of transmitting direction range information and/or direction extension information being used for different transmission channels; the N pieces of transmitting direction range information and/or direction extension information being used for different Panels; and the N pieces of transmitting direction range information and/or direction extension information being used for channel information indication or interference information indication.

In an alternative embodiment, the method may include at least one of: the N transmission beam sets corresponding to different subbands; the N transmission beam sets corresponding to different transmission layers; the N transmission beam sets corresponding to different SRS resources; the N transmission beam sets corresponding to different PUCCH resources; the N transmission beam sets corresponding to different PUSCH resources; the N transmission beam sets being used for different transmission channels; the N transmission beam sets being used for different Panels; and the N transmission beam sets being used for channel information indication or interference information indication.

In an alternative embodiment, the method may include at least one of: the N CSI processes corresponding to different transmission layers; the N CSI processes corresponding to different SRS resources; the N CSI processes corresponding to different PUCCH resources; the N CSI processes corresponding to different PUSCH resources; the N CSI processes being used for different transmission channels; the N CSI processes being used for different Panels; and the N CSI processes being used for channel information indication or interference information indication.

In an alternative embodiment, the method may further include: switching or combining at least one of the following modes for determining the uplink transmission parameters through a second signaling and/or an implicit indication of a Downlink Control Information (DCI) Format configured by the network side: determining the uplink transmission parameters according to the received information corresponding to one or more of the downlink reference signal resources selected from the downlink reference signal resource groups; determining the uplink transmission parameters according to one or more of the codewords selected from the codeword groups; determining the uplink transmission parameters according to one or more pieces of direction range information selected from the N pieces of transmitting direction range information, or, determining the uplink transmission parameters according to one or more pieces of direction extension information selected from the N pieces of direction extension information, or, determining the uplink transmission parameters according to one or more pieces of direction range information and direction extension information selected from the N pieces of transmitting direction range information and direction extension information; determining the uplink transmission parameters according to one or more of the transmission beams selected from the transmission beam sets; determining the uplink transmission parameters according to one or more of the CSI Processes selected from the N CSI Processes; and determining the uplink transmission parameters according to the SRS transmission parameters.

In an alternative embodiment, the method may further include at least one of: determining the uplink transmission parameters of uplink data or control information according to the codeword groups and the SRS transmission parameters; determining the uplink transmission parameters of a reference demodulation pilot corresponding to the uplink data or control information according to the SRS transmission parameters; determining the uplink transmission parameters of uplink data or control information according to the downlink reference pilot groups indicated by the codeword groups; determining the uplink transmission parameters of a reference demodulation pilot corresponding to the uplink data or control information according to the downlink reference pilot groups; determining the uplink transmission parameters of uplink data or control information according to the codeword groups and the transmission beam sets; and determining the uplink transmission parameters of a reference demodulation pilot corresponding to the uplink data or control information according to the transmission beam sets.

In an alternative embodiment, the method may further include: switching modes for determining precoding, wherein the switching may be implemented by at least one of: a third signaling configured by the network side, and an implicit indication of a DCI Format; a precoding mode designated by the network side includes: designating precoding parameters of the terminal at the network side, wherein modes for determining precoding include at least one of: determining the precoding by the terminal; and selecting precoding parameters according to rules configured or stipulated by the network side, and determining the precoding according to the precoding parameters.

Figure 5:
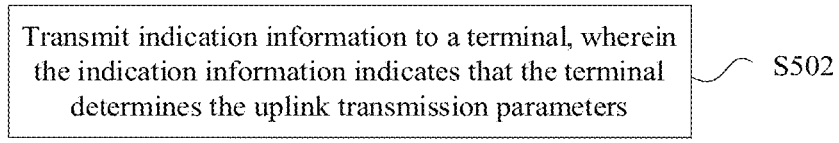
FIG. 5 is a second flowchart of a method for determining uplink transmission parameters according to an embodiment of the present disclosure.

In this embodiment, a method for determining uplink transmission parameters is provided. FIG. 5 is a second flowchart of a method for determining uplink transmission parameters according to an embodiment of the present disclosure. As shown in FIG. 5, the flow includes step S502.

At step S502, indication information is transmitted to a terminal, wherein the indication information indicates the terminal to determine the uplink transmission parameters.

Through the above step, the base station transmits indication information to the terminal so that the terminal may determine the uplink transmission parameters according to the received indication information. Therefore, the problem that the terminal cannot determine uplink transmission parameters in a variety of complicated antenna configurations can be solved, and the effects of determining the uplink transmission parameters in the a variety of complicated antenna configurations and effectively reducing the overhead are achieved.

In an implementation, the executor of the above step may be a base station, but is not limited thereto.

In an alternative embodiment, the step of transmitting the indication information to the terminal may include at least one of: transmitting indication information of N downlink reference signal resource groups to the terminal, wherein each of the downlink reference signal resource groups includes one or more downlink reference signal resources, and the received information corresponding to the one or more downlink reference signal resources in the downlink reference signal resource groups is used for indicating the terminal to determine the uplink transmission parameters, where N is an integer greater than or equal to 1; transmitting indication information of N codeword groups to the terminal, wherein each of the codeword groups includes one or more codewords, and one or more of the codewords in the codeword groups are used for indicating the terminal to determine the uplink transmission parameters, wherein N is an integer greater than or equal to 1; transmitting N pieces of transmitting direction range information and/or direction extension information to the terminal, wherein one or more pieces of direction range information in the N pieces of transmitting direction range information is used for indicating the terminal to determine the uplink transmission parameters, or, one or more pieces of direction extension information in the N pieces of direction extension information is used for indicating the terminal to determine the uplink transmission parameters, or, one or more pieces of direction range information and direction extension information in the N pieces of transmitting direction range information and direction extension information is used for indicating the terminal to determine the uplink transmission parameters, wherein N is an integer greater than or equal to 1; transmitting indication information of N transmission beam sets to the terminal, wherein each of the transmission beam sets includes one or more transmission beams, and one or more of the transmission beams in the transmission beam sets are used for indicating the terminal to determine the uplink transmission parameters, wherein N is an integer greater than or equal to 1; and transmitting indication information of N CSI processes to the terminal, wherein one or more of the CSI processes in the N CSI processes are used for indicating the terminal to determine the uplink transmission parameters, wherein N is an integer greater than or equal to 1.

In an alternative embodiment, the indication information of the N downlink reference signal resource groups includes N CRI groups, wherein N is greater than or equal to 2, and includes at least one of: the N CRI groups corresponding to different subbands; the N CRI groups corresponding to different transmission layers; the N CRI groups corresponding to different SRS resources; the N CRI groups corresponding to different PUCCH resources; the N CRI groups corresponding to different PUSCH resources; the N CRI groups being used for different transmission channels; the N CRI groups being used for different Panels; the N CRI groups being used for different codeword streams; the N CRI groups being used for channel information indication or interference information indication; and the N CRI groups corresponding to different transmission resources.

In an alternative embodiment, the method may further include: transmitting a first signaling to the terminal, the first signaling being used for indicating that the N CRI groups are able to be used for determining the uplink transmission parameters, wherein the first signaling is transmitted for at least one of: a subband, a layer, a PUCCH, a PUSCH, a transmission channel, and a Panel.

In an alternative embodiment, the method may include at least one of: the codewords included in the same codeword group coming from one or more codebooks; the N codeword groups corresponding to different subbands; the N codeword groups corresponding to different transmission layers; the N codeword groups corresponding to different SRS resources; the N codeword groups corresponding to different PUCCH resources; the N codeword groups corresponding to different PUSCH resources; the N codeword groups being used for different transmission channels; the N codeword groups being used for different Panels; the N codeword groups being used for channel information indication or interference information indication; and the N codeword groups corresponding to different transmission resources.

In an alternative embodiment, the method may include at least one of: the transmitting directions indicated by the N pieces of transmitting direction range information corresponding to same or different ones of N pieces of direction extension information; the N pieces of transmitting direction range information and/or direction extension information corresponding to different subbands; the N pieces of transmitting direction range information and/or direction extension information corresponding to different transmission layers; the N pieces of transmitting direction range information and/or direction extension information corresponding to different SRS resources; the N pieces of transmitting direction range information and/or direction extension information corresponding to different PUCCH resources; the N pieces of transmitting direction range information and/or direction extension information corresponding to different PUSCH resources; the N pieces of transmitting direction range information and/or direction extension information being used for different transmission channels; the N pieces of transmitting direction range information and/or direction extension information being used for different Panels; and the N pieces of transmitting direction range information and/or direction extension information being used for channel information indication or interference information indication.

In an alternative embodiment, the method may include at least one of: the N transmission beam sets corresponding to different subbands; the N transmission beam sets corresponding to different transmission layers; the N transmission beam sets corresponding to different SRS resources; the N transmission beam sets corresponding to different PUCCH resources; the N transmission beam sets corresponding to different PUSCH resources; the N transmission beam sets being used for different transmission channels; the N transmission beam sets being used for different Panels; and the N transmission beam sets being used for channel information indication or interference information indication.

In an alternative embodiment, the method may include at least one of: the N CSI processes corresponding to different transmission layers; the N CSI processes corresponding to different SRS resources; the N CSI processes corresponding to different PUCCH resources; the N CSI processes corresponding to different PUSCH resources; the N CSI processes being used for different transmission channels; the N CSI processes being used for different Panels; and the N CSI processes being used for channel information indication or interference information indication.

In an alternative embodiment, the method may further include: configuring a second signaling and/or an implicit indication of a DCI Format to the terminal, wherein the second signaling and/or the implicit indication of the DCI Format is used for indicating the terminal to switch or combine modes for determining the uplink transmission parameters.

In an alternative embodiment, the method may further include: configuring a third signaling and/or an implicit indication of a DCI Format to the terminal, wherein the third signaling and/or the implicit indication of the DCI Format is used for indicating the terminal to switch modes for determining precoding; wherein the modes for determining precoding include at least one of: determining the precoding by the terminal; selecting precoding parameters according to configured or stipulated rules, and determining the precoding according to the precoding parameters; and selecting precoding parameters in a selection range configured by the network side, and determining the precoding according to the precoding parameters.

Figure 6:
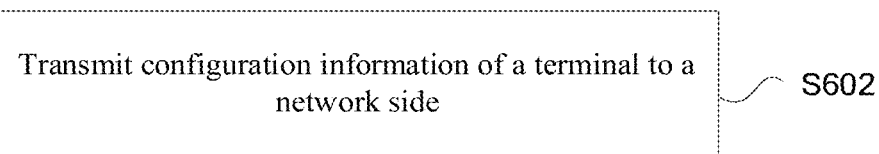
FIG. 6 is a flowchart of a method for transmitting configuration information according to an embodiment of the present disclosure.

In this embodiment, a method for transmitting configuration information is provided. FIG. 6 is a flowchart of a method for transmitting configuration information according to an embodiment of the present disclosure. As shown in FIG. 6, the flow includes step S602:

At step S602, configuration information of a terminal is transmitted to a network side.

The configuration information includes at least one of: codebook configuration information of the terminal corresponding to an SRS; a codebook type supported by the terminal; the maximum number of supported layers corresponding to an SRS or a Panel; a maximum supported transmission power corresponding to an SRS or a Panel; a space angle range corresponding to an SRS or a Panel; the number of supported SRIs when uplink data transmission is supported; the number of supported DRI SRIs when uplink data transmission is supported; a capacity of the terminal regarding whether it supports uplink transmission based on a downlink reference signal; a capacity of the terminal regarding whether it supports selection of uplink codewords; capacity information of the terminal supporting single or multiple beam transmission; and one piece of the following information that is most associated with a DMRS port of the terminal: an SRS, a CSI-RS port, and the number of port groups; and the maximum number of estimated phase noise pilots supported by the terminal.

Through the above step, since the terminal transmits configuration information thereof to the network side, the problem that the base station cannot know configuration information of the terminal in a variety of complicated antenna configurations can be solved, and the effects of enabling the base station to know configuration information of the terminal in the a variety of complicated antenna configurations and effectively reducing the overhead are achieved.

In an implementation, the executor of the above steps may be a terminal, but is not limited thereto.

In an alternative embodiment, the codebook type supported by the terminal includes at least one of: a 8 Phase Shift Keying (PSK) codeword element codebook; a Quadrature Phase Shift Keying (QPSK) codeword element codebook; and a Binary Phase Shift Keying (BPSK) codeword element codebook; a codebook type where the codewords do not contain 0 element; a codebook type where the codewords contain 0 element; a codebook merged by a port; and a codebook selected by a port. In the present embodiment, the 8PSK in the above description means 8 Phase Shift Keying.

The present disclosure will be described in detail below with reference to the specific embodiments.

The following embodiments mainly solve the problem of providing a new method for uplink transmission and a new method for indicating uplink transmission parameters which can adapt to a variety of complicated antenna configurations, fully utilize the channel reciprocity, effectively reduce the pilot overhead and the physical layer signaling overhead, and have better resistance to interference. The term "transmission" herein includes pilot transmission, data transmission, and control transmission.

Specific Embodiment 1

In this embodiment, there is provided a method for reporting terminal configuration information, which mainly includes step S101.

At step 101: the terminal transmits one or more pieces of the following information to the base station:

codebook configuration information corresponding to an SRS;

a codebook type supported by the terminal, including: a codeword element type (e.g. a 8PSK element codebook/a 4PSK (QPSK) element codebook) without/with 0 codebook (port Combination codebook and port selection);

the maximum number of supported layers corresponding to the SRS/Panel;

a maximum supported transmission power corresponding to an SRS/Panel;

a space angle range corresponding to an SRS/Panel;

the number of supported SRIs during uplink transmission;

a capacity of the terminal regarding whether it supports reciprocal transmission;

a capacity of the terminal regarding whether it supports a UE to select uplink codewords;

whether the terminal supports multi-beam transmission;

the number of SRS/CSI-RS ports or port groups which are most associated with a DMRS port; and the maximum number of estimated phase noise pilots supported by the terminal.

Specific Embodiment 2

In this embodiment, there is provided an uplink transmitting method, which mainly includes steps S201 to S206.

At step 201, a base station indicates information of N CRIs or CRI groups, where N is a natural number equal to or greater than 1 The information of CRIs or CRI groups is used for indicating CSI-RS resources/resource groups for reference in determination of the uplink transmission parameters by the terminal.

The CSI-RS resources indicated by the N CRIs or CRI groups may come from one or more sets of CSI-RSs;

the N CRIs or CRI groups may correspond to different subbands;

the N CRIs or CRI groups may correspond to different transmission layers;

the N CRIs or CRI groups may correspond to different SRS resources;

the N CRIs or CRI groups may correspond to different PUCCH resources;

the N CRIs or CRI groups may correspond to different PUSCH resources;

the N CRIs or CRI groups may be used for different transmission channels;

the N CRIs or CRI groups may be used for different Panels;

the N CRIs or CRI groups may be used for channel information indication as well as interference information indication; and the N CRIs or CRI groups correspond to different transmission resources (e.g. time domain symbols, frequency domain carriers, receiving beams).

At step 202, the terminal determines the uplink transmission parameters according to the CRI information and performs uplink transmission.

At step 203, the base station configures indication information of N codewords or codeword groups, where N is a natural number equal to or greater than 1 The information of the codewords or codeword groups is used for reference in determination of the uplink transmission parameters by the terminal.

The codewords indicated by the N codewords or codeword groups may come from one or more codebooks;

the N codewords or codeword groups may correspond to different subbands;

the N codewords or codeword groups may correspond to different transmission layers;

the N codewords or codeword groups may correspond to different SRS resources;

the N codewords or codeword groups may correspond to different PUCCH resources;

the N codewords or codeword groups may correspond to different PUSCH resources;

the N codewords or codeword groups may correspond to different transmission channels;

the N codewords or codeword groups may correspond to different Panels;

the N codewords or codeword groups may be used for channel information indication as well as interference information indication; and the N codewords or codeword groups may correspond to different transmission resources (e.g. time domain symbols, frequency domain carriers, receiving beams).

At step 204, the terminal determines the uplink transmission parameters according to the information of the cordwords or codeword groups and performs uplink transmission.

At step 205, the base station configures indication information of N transmitting direction ranges and/or direction extension information, where N is a natural number equal to or greater than 1. The transmitting direction range information of is used for reference in determination of the uplink transmission parameters by the terminal.

The transmitting directions indicated by N transmitting direction ranges may correspond to the same or different direction extensions;

the indication information of the N transmitting direction ranges and/or direction extension may correspond to different subbands;

the indication information of the N transmitting direction ranges and/or direction extension may correspond to different transmission layers;

the indication information of the N transmitting direction ranges and/or direction extension may correspond to different SRS resources;

the indication information of the N transmitting direction ranges and/or direction extension may correspond to different PUCCH resources;

the indication information of the N transmitting direction ranges and/or direction extension may correspond to different PUSCH resources;

the indication information of the N transmitting direction ranges and/or direction extension may be used for different transmission channels;

the indication information of the N transmitting direction ranges and/or direction extension may be used for different Panels; and the indication information of the N transmitting direction ranges and/or direction extension may be used for channel information indication as well as interference information indication.

At step 206, the terminal determines the uplink transmission parameters according to the indication information of the N transmitting direction ranges and/or direction extension, and performs uplink transmission.

Switching between at least two of the three modes may be supported, and the switching method includes: configuring a base station signaling; and performing an implicit indication through a DCI Format.

Switching between a mode where a UE determines precoding and a mode where the base station designates precoding may also be supported, and the switching method includes: configuring a base station signaling; and performing an implicit indication through a DCI Format.

Through the description of the above embodiment, those skilled in the art can clearly understand that the method according to the above embodiment may be implemented by means of software plus a necessary general hardware platform. Obviously, it may also be implemented by hardware, but in most cases, the former is preferable. Based on such understanding, part of the technical solution of the present disclosure, which is essential or contributes to the prior art, may be embodied in the form of a software product. The computer software product is stored in a storage medium (such as a ROM/RAM, a disk, or an optical disk) and includes the number of instructions for causing a terminal device (which may be a cell phone, a computer, a server, or a network device, etc.) to perform the methods described in various embodiments of the present disclosure.

In this embodiment, there is further provided a device for determining uplink transmission parameters configured to implement the above embodiments and preferable implementations. Details which have been explained will not be repeated here. As used herein, the term "module" may be a combination of software and/or hardware that can realize a preset function. The devices described in the following embodiments are preferably implemented in software, but hardware, or a combination of software and hardware, is also possible and contemplated.

Figure 7:
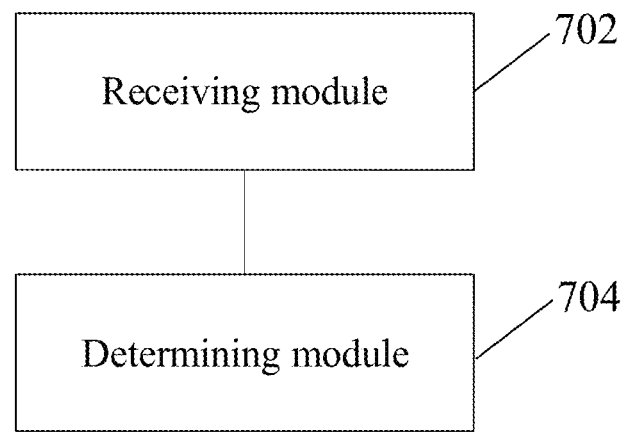
FIG. 7 is a first structural block diagram of a device for determining uplink transmission parameters according to an embodiment of the present disclosure.

FIG. 7 is a first structural block diagram of a device for determining uplink transmission parameters according to an embodiment of the present disclosure. As shown in FIG. 7, the device includes a receiving module 702 and a determining module 704, and will be described in detail below.

The receiving module 702 is configured to receive indication information transmitted from a network side; and the determining module 704 is connected to the receiving module 702 and configured to determine uplink transmission parameters on the basis of the indication information.

In an alternative embodiment, the device may include at least one of: the receiving module 702 configured to receive indication information of N downlink reference signal resource groups indicated by the network side, wherein each of the downlink reference signal resource groups includes one or more downlink reference signal resources; the determining module 704 configured to determine the uplink transmission parameters according to the received information corresponding to one or more of the downlink reference signal resources selected from the downlink reference signal resource groups, wherein N is an integer greater than or equal to 1; the receiving module 702 configured to receive indication information of N codeword groups configured by the network side, wherein each of the codeword groups includes one or more codewords; the determining module 704 configured to determine the uplink transmission parameters according to one or more of the codewords selected from the codeword groups, wherein N is an integer greater than or equal to 1; the receiving module 702 configured to receive N pieces of transmitting direction range information and/or direction extension information configured by the network side; the determining module 704 configured to determine the uplink transmission parameters based on one of: one or more pieces of direction range information selected from the N pieces of transmitting direction range information, one or more pieces of direction extension information selected from the N pieces of direction extension information, and one or more pieces of direction range information and direction extension information selected from the N pieces of transmitting direction range information and direction extension information, wherein N is an integer greater than or equal to 1; the receiving module 702 configured to receive indication information of N transmission beam sets configured by the network side, wherein each of the transmission beam sets includes one or more transmission beams; the determining module 704 configured to determine the uplink transmission parameters according to one or more of the transmission beams selected from the transmission beam sets, wherein N is an integer greater than or equal to 1; and the receiving module 702 configured to receive indication information of N channel state information processes (CSI Processes) configured by the network side; and the determining module 704 configured to determine the uplink transmission parameters according to one or more of the CSI Processes selected from the N CSI Processes, wherein N is an integer greater than or equal to 1.

In an alternative embodiment, the indication information of the N downlink reference signal resource groups may include N CRI groups, wherein N is greater than or equal to 2, and includes at least one of: the N CRI groups corresponding to different subbands; the N CRI groups corresponding to different transmission layers; the N CRI groups corresponding to different SRS resources; the N CRI groups corresponding to different PUCCH resources; the N CRI groups corresponding to different PUSCH resources; the N CRI groups being used for different transmission channels; the N CRI groups being used for different Panels; the N CRI groups being used for different codeword streams; the N CRI groups being used for channel information indication or interference information indication; and the N CRI groups corresponding to different transmission resources.

In an alternative embodiment, the device may further include: a first processing module configured to determine that the N CRI groups are able to be used for determining the uplink transmission parameters by a first signaling transmitted from the network side, wherein the first signaling is configured by the network side for at least one of: a subband, a layer, a PUCCH, a PUSCH, a transmission channel, and a Panel.

In an alternative embodiment, the device may include at least one of: the codewords included in the same codeword group coming from one or more codebooks; the N codeword groups corresponding to different subbands; the N codeword groups corresponding to different transmission layers; the N codeword groups corresponding to different SRS resources; the N codeword groups corresponding to different PUCCH resources; the N codeword groups corresponding to different PUSCH resources; the N codeword groups being used for different transmission channels; the N codeword groups being used for different Panels; the N codeword groups being used for channel information indication or interference information indication; and the N codeword groups corresponding to different transmission resources.

In an alternative embodiment, the device may include at least one of: the transmitting directions indicated by the N pieces of transmitting direction range information corresponding to same or different ones of N pieces of direction extension information; the N pieces of transmitting direction range information and/or direction extension information corresponding to different subbands; the N pieces of transmitting direction range information and/or direction extension information corresponding to different transmission layers; the N pieces of transmitting direction range information and/or direction extension information corresponding to different SRS resources; the N pieces of transmitting direction range information and/or direction extension information corresponding to different PUCCH resources; the range information of the N transmitting directions and/or extension information of the N directions corresponding to different PUSCH resources; the N pieces of transmitting direction range information and/or direction extension information being used for different transmission channels; the N pieces of transmitting direction range information and/or direction extension information being used for different Panels; and the N pieces of transmitting direction range information and/or direction extension information being used for channel information indication or interference information indication.

In an alternative embodiment, the device may include at least one of: the N transmission beam sets corresponding to different subbands; the N transmission beam sets corresponding to different transmission layers; the N transmission beam sets corresponding to different SRS resources; the N transmission beam sets corresponding to different PUCCH resources; the N transmission beam sets corresponding to different PUSCH resources; the N transmission beam sets being used for different transmission channels; the N transmission beam sets being used for different Panels; and the N transmission beam sets being used for channel information indication or interference information indication.

In an alternative embodiment, the device may include at least one of: the N CSI processes corresponding to different transmission layers; the N CSI processes corresponding to different SRS resources; the N CSI processes corresponding to different PUCCH resources; the N CSI processes corresponding to different PUSCH resources; the N CSI processes being used for different transmission channels; the N CSI processes being used for different Panels; and the N CSI processes being used for channel information indication or interference information indication.

In an alternative embodiment, the device may further include: a second processing module configured to switch or combine at least one of the following modes for determining the uplink transmission parameters through a second signaling and/or an implicit indication of a DCI Format configured by the network side: determining the uplink transmission parameters according to the received information corresponding to one or more of the downlink reference signal resources selected from the downlink reference signal resource groups; determining the uplink transmission parameters according to one or more of the codewords selected from the codeword groups; determining the uplink transmission parameters according to one or more pieces of direction range information selected from the N pieces of transmitting direction range information, or, determining the uplink transmission parameters according to one or more pieces of direction extension information selected from the N pieces of direction extension information, or, determining the uplink transmission parameters according to the one or more pieces of direction range information and direction extension information selected from the N pieces of transmitting direction range information and direction extension information; determining the uplink transmission parameters according to one or more of the transmission beams selected from the transmission beam sets; determining the uplink transmission parameters according to one or more of the CSI Processes selected from the N CSI Processes; and determining the uplink transmission parameters according to the SRS transmission parameters.

In an alternative embodiment, the device may be further configured to perform at least one of: determining the uplink transmission parameters of uplink data or control information according to the codeword groups and the SRS transmission parameters; determining the uplink transmission parameters of a reference demodulation pilot corresponding to the uplink data or control information according to the SRS transmission parameters; determining the uplink transmission parameters of uplink data or control information according to the downlink reference pilot groups indicated by the codeword groups; determining the uplink transmission parameters of a reference demodulation pilot corresponding to the uplink data or control information according to the downlink reference pilot groups; determining the uplink transmission parameters of uplink data or control information according to the codeword groups and the transmission beam sets; and determining the uplink transmission parameters of a reference demodulation pilot corresponding to the uplink data or control information according to the transmission beam sets.

In an alternative embodiment, the device further includes a third processing module configured to switch modes for determining precoding, wherein the switching is implemented by at least one of: a third signaling configured by the network side, and an implicit indication of a DCI Format, a precoding mode designated by the network side includes: designating precoding parameters of the terminal at the network side; wherein modes for determining precoding include at least one of: determining the precoding by the terminal; and selecting precoding parameters according to rules configured or stipulated by the network side, and determining the precoding according to the precoding parameters.

Figure 8:
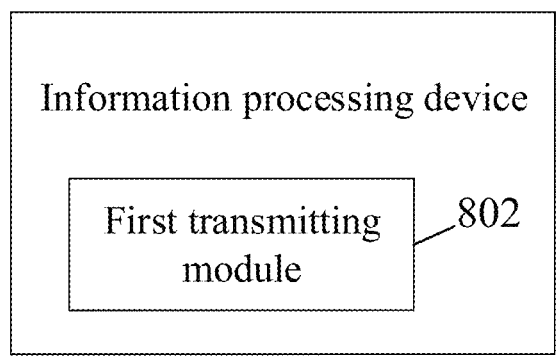
FIG. 8 is a second structural block diagram of a device for determining uplink transmission parameters according to an embodiment of the present disclosure.

FIG. 8 is a second structural block diagram of a device for determining uplink transmission parameters according to an embodiment of the present disclosure. As shown in FIG. 8, the device includes a first transmitting module 802, which will be described in detail below.

The first transmitting module 802 is configured to transmit indication information to a terminal, wherein the indication information indicates the terminal to determine the uplink transmission parameters.

In an alternative embodiment, the first transmitting module 802 includes at least one of: a first transmitting unit configured to transmit indication information of N downlink reference signal resource groups to the terminal, wherein each of the downlink reference signal resource groups includes one or more downlink reference signal resources, and the received information corresponding to the one or more downlink reference signal resources in the downlink reference signal resource groups is used for indicating the terminal to determine the uplink transmission parameters, where N is an integer greater than or equal to 1; a second transmitting unit configured to transmit indication information of N codeword groups to the terminal, wherein each of the codeword groups includes one or more codewords, and one or more of the codewords in the codeword groups are used for indicating the terminal to determine the uplink transmission parameters, where N is an integer greater than or equal to 1; a third transmitting unit configured to transmit N pieces of transmitting direction range information and/or direction extension information to the terminal, wherein one or more pieces of direction range information in the N pieces of transmitting direction range information is used for indicating the terminal to determine the uplink transmission parameters, one or more pieces of direction extension information in the N pieces of direction extension information is used for indicating the terminal to determine the uplink transmission parameters, one or more pieces of direction range information and direction extension information in the N pieces of transmitting direction range information and direction extension information of the N directions is used for indicating the terminal to determine the uplink transmission parameters, where N is an integer greater than or equal to 1; a fourth transmitting unit configured to transmit indication information of N transmission beam sets to the terminal, wherein each of the transmission beam sets includes one or more transmission beams, and one or more of the transmission beams in the transmission beam sets are used for indicating the terminal to determine the uplink transmission parameters, wherein N is an integer greater than or equal to 1; and a fifth transmitting unit configured to transmit indication information of N CSI processes to the terminal, wherein one or more of the CSI processes in the N CSI processes are used for indicating the terminal to determine the uplink transmission parameters, wherein N is an integer greater than or equal to 1.

In an alternative embodiment, the indication information of the N downlink reference signal resource groups may include N CRI groups, wherein N is greater than or equal to 2, and includes at least one of: the N CRI groups corresponding to different subbands; The N CRI groups corresponding to different transmission layers; the N CRI groups corresponding to different SRS resources; the N CRI groups corresponding to different PUCCH resources; the N CRI groups corresponding to different PUSCH resources; the N CRI groups being used for different transmission channels; the N CRI groups being used for different Panels; the N CRI groups being used for different codeword streams; the N CRI groups being used for channel information indication or interference information indication; and the N CRI groups corresponding to different transmission resources.

In an alternative embodiment, the device may further include: a second transmitting module configured to transmit a first signaling to the terminal, the first signaling being used for indicating that the N CRI groups are able to be used for determining the uplink transmission parameters, wherein the first signaling is transmitted for at least one of: a subband, a layer, a PUCCH, a PUSCH, a transmission channel, and a Panel.

In an alternative embodiment, the device may include at least one of: the codewords included in the same codeword group coming from one or more codebooks; the N codeword groups corresponding to different subbands; the N codeword groups corresponding to different transmission layers; the N codeword groups corresponding to different SRS resources; the N codeword groups corresponding to different PUCCH resources; the N codeword groups corresponding to different PUSCH resources; the N codeword groups being used for different transmission channels; the N codeword groups being used for different Panels; the N codeword groups being used for channel information indication or interference information indication; and the N codeword groups corresponding to different transmission resources.

In an alternative embodiment, the device may include at least one of: the transmitting directions indicated by the N pieces of transmitting direction range information of corresponding to same or different ones of N pieces of direction extension information; the N pieces of transmitting direction range information and/or direction extension information corresponding to different subbands; the N pieces of transmitting direction range information and/or direction extension information corresponding to different transmission layers; the N pieces of transmitting direction range information and/or direction extension information corresponding to different SRS resources; the N pieces of transmitting direction range information and/or direction extension information corresponding to different PUCCH resources; the N pieces of transmitting direction range information and/or direction extension information corresponding to different PUSCH resources; the N pieces of transmitting direction range information and/or direction extension information being used for different transmission channels; the N pieces of transmitting direction range information and/or direction extension information being used for different Panels; and the N pieces of transmitting direction range information and/or direction extension information being used for channel information indication or interference information indication.

In an alternative embodiment, the device may include at least one of: the N transmission beam sets corresponding to different subbands; the N transmission beam sets corresponding to different transmission layers; the N transmission beam sets corresponding to different SRS resources; the N transmission beam sets corresponding to different PUCCH resources; the N transmission beam sets corresponding to different PUSCH resources; the N transmission beam sets being used for different transmission channels; the N transmission beam sets being used for different Panels; and the N transmission beam sets being used for channel information indication or interference information indication.

In an alternative embodiment, the device may include at least one of: the N CSI processes corresponding to different transmission layers; the N CSI processes corresponding to different SRS resources; the N CSI processes corresponding to different PUCCH resources; the N CSI processes corresponding to different PUSCH resources; the N CSI processes being used for different transmission channels; the N CSI processes being used for different Panels; and the N CSI processes being used for channel information indication or interference information indication.

In an alternative embodiment, the device further includes a fourth processing module configured to configure a second signaling and/or an implicit indication of a DCI Format to the terminal, wherein the second signaling and/or the implicit indication of the DCI Format is used for indicating the terminal to switch or combine modes for determining the uplink transmission parameters.

In an alternative embodiment, the device further includes a fifth processing module configured to configure a third signaling and/or an implicit indication of a DCI Format to the terminal, wherein the third signaling and/or the implicit indication of the DCI Format is used for indicating the terminal to switch modes for determining precoding; wherein the modes for the terminal determining precoding include at least one of: determining the precoding by the terminal; selecting precoding parameters according to configured or stipulated rules, and determining the precoding according to the precoding parameters; and selecting precoding parameters in a selection range configured by the network side, and determining the precoding according to the precoding parameters.

Figure 9:
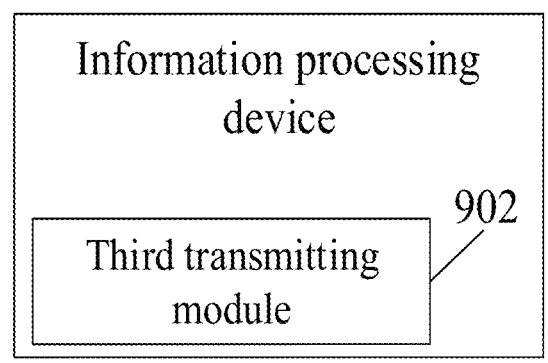
FIG. 9 is a structural block diagram of a configuration information transmitting device according to an embodiment of the present disclosure.

FIG. 9 is a structural block diagram of a configuration information transmitting device according to an embodiment of the present disclosure. As shown in FIG. 9, the device includes a third transmitting module 902 which will be described in detail below.

The third transmitting module 902 is configured to transmit configuration information of a terminal to a network side, wherein the configuration information includes at least one of: codebook configuration information of the terminal corresponding to an SRS; a codebook type supported by the terminal; the maximum number of supported layers corresponding to an SRS or a Panel; a maximum supported transmission power corresponding to an SRS or a Panel; a space angle range corresponding to an SRS or a Panel; the number of supported SRIs when uplink data transmission is supported; the number of supported DRI SRIs when uplink data transmission is supported; a capacity of the terminal regarding whether it supports uplink transmission based on a downlink reference signal; a capacity of the terminal regarding whether it supports selection of uplink codewords; capacity information of the terminal supporting single or multiple beam transmission; one piece of the following information that is most associated with a DMRS port of the terminal: an SRS, a CSI-RS port, and the number of port groups; and the maximum number of estimated phase noise pilots supported by the terminal.

In an alternative embodiment, the codebook type supported by the terminal includes at least one of: a 8 Phase Shift Keying (PSK) codeword element codebook; a Quadrature Phase Shift Keying (QPSK) codeword element codebook; a Binary Phase Shift Keying (BPSK) codeword element codebook; a codebook type where the codewords do not contain 0 element; a codebook type where the codewords contain 0 element; a codebook merged by a port; and a codebook selected by a port.

According to still another embodiment of the disclosure, there is further provided a storage medium including a program stored thereon, wherein the program, when executed, performs the method of any one of the above.

According to still another embodiment of the disclosure, there is further provided a processor for executing a program, wherein the program, when executed, performs the method of any one of the above.

It should be noted that each of the above modules may be implemented by software or hardware. For the latter, it may be implemented by, but are not limited to: the above modules all located in the same processor; or the above modules each located in different processors in any combination.

In an embodiment of the present disclosure, there is further provided a storage medium including a program stored thereon, wherein the program, when executed, performs the method of any one of the above.

Optionally, in this embodiment, the storage medium may also be configured to store a program code for performing the above steps.

In this embodiment, the storage medium may include, but is not limited to: a U Disk, a read-only memory (ROM), a random access memory (RAM), a mobile hard disk, a disk or an optical disk, and other media that can store a program code.

In an embodiment of the present disclosure, there is further provided a processor for executing a program, wherein the program, when executed, performs the steps of any of the methods described above.

Specific examples in the present embodiment may refer to the examples described in the foregoing embodiments and alternative implementations, which will not be repeated in the present embodiment.

Obviously, those skilled in the art would understand that the above modules and steps of the present disclosure can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. In this way, the present disclosure is not restricted to any particular hardware and software combination.

The descriptions above are only preferable embodiments of the present disclosure, which are not used to limit the present disclosure. For those skilled in the art, the present disclosure may have various changes and variations. Any amendments, equivalent substitutions, improvements, etc. within the principle of the disclosure are all included in the scope of the protection defined by the appended claims of the disclosure.

INDUSTRIAL APPLICABILITY

In the embodiments of the present disclosure, the network side transmits indication information to the terminal, while the terminal receives indication information transmitted from the network side, and determines uplink transmission parameters on the basis of the indication information. Therefore, the problem that the terminal cannot determine uplink transmission parameters in a variety of complicated antenna configurations can be solved, and the effects of determining the uplink transmission parameters in the a variety of complicated antenna configurations and effectively reducing the overhead are achieved.

The invention claimed is:

1. A method for determining uplink transmission parameters, comprising:
receiving indication information transmitted from a network side;
determining uplink transmission parameters on the basis of the indication information; and
switching or combining modes for determining the uplink transmission parameters through a second signaling and/or an implicit indication of a Downlink Control Information (DCI) Format configured by the network side,
wherein the method comprises at least one of:
the step of receiving the indication information transmitted from the network side includes: receiving indication information of N downlink reference signal resource groups indicated by the network side, wherein each of the downlink reference signal resource groups includes one or more downlink reference signal resources; and the step of determining the uplink transmission parameters on the basis of the indication information includes: determining the uplink transmission parameters according to the received information corresponding to one or more of the downlink reference signal resources selected from the downlink reference signal resource groups, wherein N is an integer greater than or equal to 1;
the step of receiving the indication information transmitted from the network side includes: receiving indication information of N codeword groups configured by the network side, wherein each of the codeword groups comprises one or more codewords; and the step of determining the uplink transmission parameters on the basis of the indication information includes: determining the uplink transmission parameters according to one or more of the codewords selected from the codeword groups, wherein N is an integer greater than or equal to 1;
the step of receiving the indication information transmitted from the network side includes: receiving N pieces of transmitting direction range information and/or direction extension information configured by the network side; the step of determining the uplink transmission parameters on the basis of the indication information includes one of: determining the uplink transmission parameters according to one or more pieces of direction range information selected from the N pieces of transmitting direction range information, determining the uplink transmission parameters according to one or more pieces of direction extension information selected from the N pieces of direction extension information, and determining the uplink transmission parameters according to one or more pieces of direction range information and direction extension information selected from the N pieces of transmitting direction range information and direction extension information, wherein N is an integer greater than or equal to 1;
the step of receiving the indication information transmitted from the network side includes: receiving indication information of N transmission beam sets configured by the network side, wherein each of the transmission beam sets comprises one or more transmission beams; and the step of determining the uplink transmission parameters on the basis of the indication information comprises: determining the uplink transmission parameters according to one or more of the transmission beams selected from the transmission beam sets, wherein N is an integer greater than or equal to 1; and
the step of receiving the indication information transmitted from the network side comprises: receiving indication information of N channel state information processes (CSI Processes) configured by the network side; and the step of determining the uplink transmission parameters on the basis of the indication information includes: determining the uplink transmission parameters according to one or more of the CSI Processes selected from the N CSI Processes, wherein N is an integer greater than or equal to 1.

2. The method according to claim 1, wherein the indication information of the N downlink reference signal resource groups comprises N CSI-RS resource indicator (CRI) groups, wherein N is greater than or equal to 2, and comprises at least one of:
the N CRI groups corresponding to different subbands;
the N CRI groups corresponding to different transmission layers;
the N CRI groups corresponding to different Sounding Reference Signal (SRS) resources;
the N CRI groups corresponding to different Physical Uplink Control Channel (PUCCH) resources;
the N CRI groups corresponding to different Physical Uplink Shared Channel (PUSCH) resources;
the N CRI groups being used for different transmission channels;
the N CRI groups being used for different antenna panels (Panels);
the N CRI groups being used for different codeword streams;
the N CRI groups being used for channel information indication or interference information indication; and
the N CRI groups corresponding to different transmission resources.

3. The method according to claim 2, further comprising:
determining that the N CRI groups are able to be used for determining the uplink transmission parameters by a first signaling transmitted from the network side;

wherein the first signaling is configured by the network side for at least one of: a subband, a layer, a PUCCH, a PUSCH, a transmission channel, and a Panel.

4. The method according to claim 1, wherein the method comprises at least one of:
- codewords comprised in the same codeword group coming from one or more codebooks;
- the N codeword groups corresponding to different subbands;
- the N codeword groups corresponding to different transmission layers;
- the N codeword groups corresponding to different SRS resources;
- the N codeword groups corresponding to different PUCCH resources;
- the N codeword groups corresponding to different PUSCH resources;
- the N codeword groups being used for different transmission channels;
- the N codeword groups being used for different Panels;
- the N codeword groups being used for channel information indication or interference information indication; and
- the N codeword groups corresponding to different transmission resources.

5. The method according to claim 1, wherein the method comprises at least one of:
- the N transmission beam sets corresponding to different subbands;
- the N transmission beam sets corresponding to different transmission layers;
- the N transmission beam sets corresponding to different SRS resources;
- the N transmission beam sets corresponding to different PUCCH resources;
- the N transmission beam sets corresponding to different PUSCH resources;
- the N transmission beam sets being used for different transmission channels;
- the N transmission beam sets being used for different Panels; and
- the N transmission beam sets being used for channel information indication or interference information indication.

6. The method according to claim 1, wherein the method comprises at least one of:
- the N CSI processes corresponding to different transmission layers;
- the N CSI processes corresponding to different SRS resources;
- the N CSI processes corresponding to different PUCCH resources;
- the N CSI processes corresponding to different PUSCH resources;
- the N CSI processes being used for different transmission channels;
- the N CSI processes being used for different Panels; and
- the N CSI processes being used for channel information indication or interference information indication.

7. The method according to claim 1,
wherein the modes include:
- determining the uplink transmission parameters according to received information corresponding to one or more of the downlink reference signal resources selected from the downlink reference signal resource groups;
- determining the uplink transmission parameters according to one or more of the codewords selected from the codeword groups;
- determining the uplink transmission parameters according to one or more pieces of direction range information selected from the N pieces of transmitting direction range information, or, determining the uplink transmission parameters according to one or more pieces of direction extension information selected from the N pieces of direction extension information, or, determining the uplink transmission parameters according to one or more pieces of direction range information and direction extension information selected from the N pieces of transmitting direction range information and direction extension information;
- determining the uplink transmission parameters according to one or more of the transmission beams selected from the transmission beam sets;
- determining the uplink transmission parameters according to one or more of the CSI Processes selected from the N CSI Processes; and
- determining the uplink transmission parameters according to the SRS transmission parameters.

8. The method according to claim 7, further comprising at least one of:
- determining the uplink transmission parameters of uplink data or control information according to the codeword groups and the SRS transmission parameters; and further determining the uplink transmission parameters of a reference demodulation pilot corresponding to the uplink data or control information according to the SRS transmission parameters;
- determining the uplink transmission parameters of uplink data or control information according to the downlink reference pilot groups indicated by the codeword groups; and further determining the uplink transmission parameters of a reference demodulation pilot corresponding to the uplink data or control information according to the downlink reference pilot groups; and
- determining the uplink transmission parameters of uplink data or control information according to the codeword groups and the transmission beam sets; and further determining the uplink transmission parameters of a reference demodulation pilot corresponding to the uplink data or control information according to the transmission beam sets.

9. A device for determining uplink transmission parameters, comprising: a receiving module and a determining module, wherein when the receiving module and the determining module are operated by a controller, the device implements the method according to claim 1.

10. A method for determining uplink transmission parameters, comprising:
- transmitting indication information to a terminal, wherein the indication information indicates the terminal to determine uplink transmission parameters, and
- configuring, by a network side, a second signaling and/or an implicit indication of a Downlink Control Information (DCI) Format, and configuring the second signaling and/or the implicit indication of the DCI Format to the terminal, wherein the second signaling and/or the implicit indication of the DCI Format to the terminal, wherein the second signaling and/or the implicit indication of the DCI Format is used for indicating the terminal to switch or combine modes for determining the uplink transmission parameters, wherein the step of transmitting the indication information to the terminal comprises at least one of:
  transmitting indication information of N downlink reference signal resource groups to the terminal, wherein each of the downlink reference signal resource groups includes one or more downlink reference signal resources, and received information corresponding to the one or more downlink reference signal resources in the downlink reference signal resource groups is used for indicating the terminal to determine the uplink transmission parameters, where N is an integer greater than or equal to 1;
  transmitting indication information of N codeword groups to the terminal, wherein each of the codeword groups includes one or more codewords, and one or more of the codewords in the codeword groups are used for indicating the terminal to determine the uplink transmission parameters, where N is an integer greater than or equal to 1; and
  transmitting N pieces of transmitting direction range information and/or direction extension information to the terminal, wherein one or more pieces of direction range information in the N pieces of transmitting direction range information is used for indicating the terminal to determine the uplink transmission parameters, or, one or more pieces of direction extension information in the N pieces of direction extension information is used for indicating the terminal to determine the uplink transmission parameters, or, one or more pieces of direction range information and direction extension information in the N pieces of transmitting direction range information and direction extension information is used for indicating the terminal to determine the uplink transmission parameters, where N is an integer greater than or equal to 1,
  transmitting indication information of N transmission beam sets to the terminal, wherein each of the transmission beam sets includes one or more transmission beams, and one or more of the transmission beams in the transmission beam sets are used for indicating the terminal to determine the uplink transmission parameters, wherein N is an integer greater than or equal to 1; and
  transmitting indication information of N channel state information (CSI) processes to the terminal, wherein one or more of the CSI processes in the N CSI processes are used for indicating the terminal to determine the uplink transmission parameters, wherein N is an integer greater than or equal to 1.

11. The method according to claim 10, characterized in that the indication information of the N downlink reference signal resource groups comprises N CSI-RS resource indicator (CRI) groups, wherein N is greater than or equal to 2, and comprises at least one of:
  the N CRI groups corresponding to different subbands;
  the N CRI groups corresponding to different transmission layers;
  the N CRI groups corresponding to different SRS resources;
  the N CRI groups corresponding to different Physical Uplink Control Channel (PUCCH) resources;
  the N CRI groups corresponding to different Physical Uplink Shared Channel (PUSCH) resources;
  the N CRI groups being used for different transmission channels;
  the N CRI groups being used for different Panels;
  the N CRI groups being used for different codeword streams;
  the N CRI groups being used for channel information indication or interference information indication; and
  the N CRI groups corresponding to different transmission resources.

12. The method according to claim 11, further comprising:
  transmitting a first signaling to the terminal, the first signaling being used for indicating that the N CRI groups are able to be used for determining the uplink transmission parameters, wherein the first signaling is transmitted for at least one of: a subband, a layer, a PUCCH, a PUSCH, a transmission channel, and a Panel.

13. The method according to claim 10, wherein the method comprises at least one of:
  codewords comprised in the same codeword group coming from one or more codebooks;
  the N codeword groups corresponding to different subbands;
  the N codeword groups corresponding to different transmission layers;
  the N codeword groups corresponding to different SRS resources;
  the N codeword groups corresponding to different PUCCH resources;
  the N codeword groups corresponding to different PUSCH resources;
  the N codeword groups being used for different transmission channels;
  the N codeword groups being used for different Panels;
  the N codeword groups being used for channel information indication or interference information indication; and
  the N codeword groups corresponding to different transmission resources.

14. The method according to claim 10, wherein the method comprises at least one of:
  the N transmission beam sets corresponding to different subbands;
  the N transmission beam sets corresponding to different transmission layers;
  the N transmission beam sets corresponding to different SRS resources;
  the N transmission beam sets corresponding to different PUCCH resources;
  the N transmission beam sets corresponding to different PUSCH resources;
  the N transmission beam sets being used for different transmission channels;
  the N transmission beam sets being used for different Panels; and
  the N transmission beam sets being used for channel information indication or interference information indication.

15. The method according to claim 10, wherein the method comprises at least one of:
  the N CSI processes corresponding to different transmission layers;
  the N CSI processes corresponding to different SRS resources;
  the N CSI processes corresponding to different PUCCH resources;
  the N CSI processes corresponding to different PUSCH resources;

the N CSI processes being used for different transmission channels;

the N CSI processes being used for different Panels; and the N CSI processes being used for channel information indication or interference information indication.

16. The method according to claim 10, further comprising:

configuring a third signaling and/or an implicit indication of a DCI Format to the terminal, wherein the third signaling and/or the implicit indication of the DCI Format is used for indicating the terminal to switch modes for determining precoding.

17. A device for determining uplink transmission parameters, comprising: a first transmitting module including a first transmitting unit, a second transmitting unit, a third transmitting unit, a fourth transmitting unit and a fifth transmitting unit, wherein when the first transmitting module is operated by a controller, the device implements the method according to claim 10.

18. A method for transmitting configuration information, comprising:

transmitting configuration information of a terminal to a network side, wherein the configuration information includes at least one of:

codebook configuration information of the terminal corresponding to a Sounding Reference Signal (SRS);

a codebook type supported by the terminal;

the maximum number of supported layers corresponding to an SRS or an antenna panel (Panel);

a maximum supported transmission power corresponding to an SRS or a Panel;

a space angle range corresponding to an SRS or a Panel;

the maximum number of supported SRS resource indicators (SRI) when uplink data transmission is supported;

the maximum number of supported DRI SRIs when uplink data transmission is supported;

a capacity of the terminal in relation to whether the terminal supports uplink transmission based on a downlink reference signal;

a capacity of the terminal in relation to whether the terminal supports selection of uplink codewords;

capacity information of the terminal supporting single or multi-beam transmission; one of the following information that is most associated with a Demodulation Reference Signal (DMRS) port of the terminal; an SRS, a Channel State Information Reference Signal (SCI-RS) port, and the number of port groups; and the maximum number of estimated phase noise pilots supported by the terminal, and the method further comprising: configuring, by the network side, a second signaling and/or an implicit indication of a Downlink Control Information (DCI) Format, and configuring the second signaling and/or the implicit indication of the DCI Format to the terminal, wherein the second signaling and/or the implicit indication of the DCI Format is used for indicating the terminal to switch or combine modes for determining the uplink transmission parameters.

19. The method according to claim 18, wherein the codebook type supported by the terminal comprises at least one of:

a 8 Phase Shift Keying (PSK) codeword element codebook;

a Quadrature Phase Shift Keying (QPSK) codeword element codebook;

a Binary Phase Shift Keying (BPSK) codeword element codebook;

a codebook type where the codewords do not contain 0 element;

a codebook type where the codewords contain 0 element;

a codebook merged by a port; and a codebook selected by a port.

20. A device for transmitting configuration information, comprising: a third transmitting module, wherein when the third transmitting module is operated by a controller, the device implements the method according to claim 18.

* * * * *